June 1, 1926.
C. S. CRICKMER
1,586,967
PISTON PACKING
Filed April 17, 1924
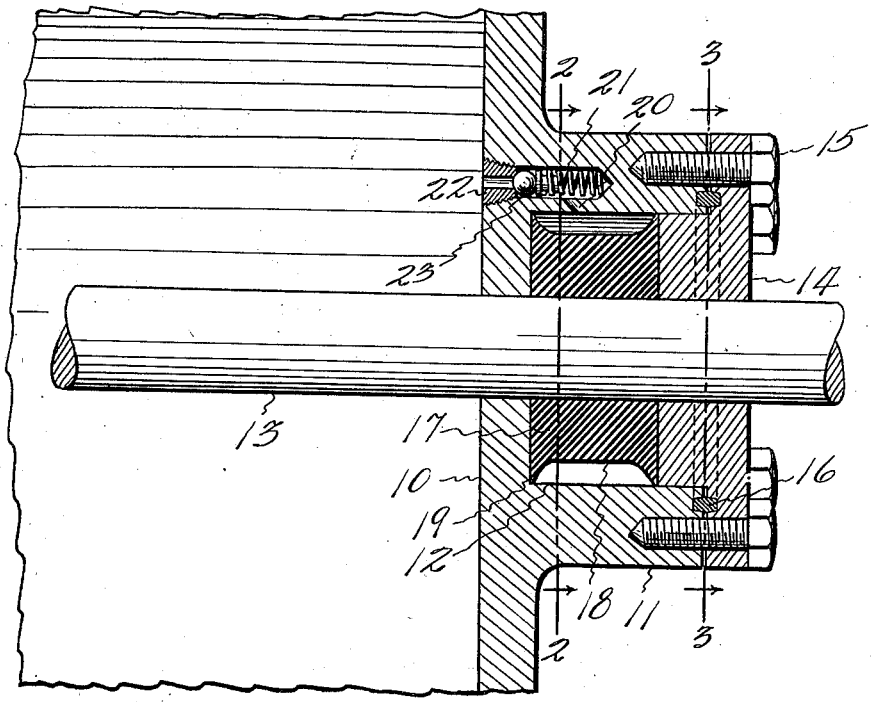
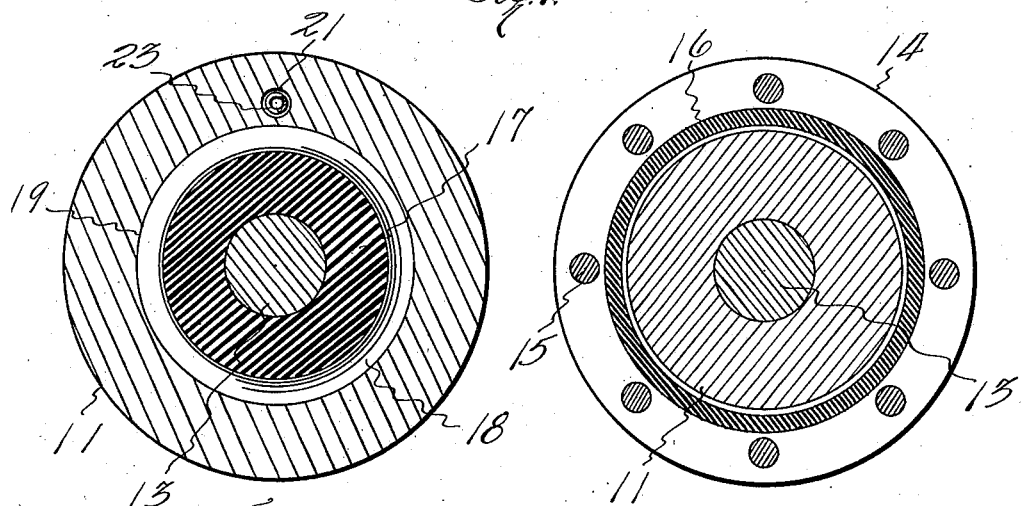
Inventor
C. S. Crickmer
By Jack Ashley
Attorney Patented June 1, 1926.

1,586,967

UNITED STATES PATENT OFFICE.

CHARLES S. CRICKMER, OF DALLAS, TEXAS, ASSIGNOR TO THE GUIBERSON CORPORATION, OF DALLAS, TEXAS, A CORPORATION OF DELAWARE.

PISTON PACKING.

Application filed April 17, 1924. Serial No. 707,277.

This invention relates to new and useful improvements in rod packings.

The invention has particularly to do with that type of packings in which a flexible or elastic member is compressed about a rod sliding therethrough, by means of fluid pressure.

In such packings considerable difficulty has been experienced in the fluid leaking between the sides of the packing member and the bottom of the stuffing box or the gland nut.

The object of the invention is to provide a packing in which the fluid is excluded from passing from the box to the rod as well as from passing along the rod.

A further object of the invention is to provide a packing in which the packing member is sealed against the bottom of the box and the gland by means of the fluid pressure.

Another object of the invention is to provide a packing member having reduced elastic sealing edges or lips located to be displaced by the fluid pressure to seal against the walls of the stuffing box.

A construction designed to carry out the invention together with other novel features will be hereinafter described.

The invention will be more readily understood from a reading of the following specification and by reference to the accompanying drawings, in which an example of the invention is shown and wherein:—

Fig. 1 is a sectional view of a stuffing box and component parts having a packing member constructed in accordance with my invention, Fig. 2 is a cross-sectional view taken on the line 2—2 of Fig. 1, and Fig. 3 is a cross-sectional view taken on the line 3—3 of Fig. 1.

In the drawings the numeral 10 designates the cap of a cylinder or other parts to which a stuffing box 11 is attached or cast. The box has the usual annular bore 12. The piston rod 13 passes through the center of the box and a gland nut 14. The nut is fastened by machine screws 15 or otherwise and receives an annular packing ring 16.

Within the bore of the box an annular packing member 17 is fitted on the piston rod 13. This member has a peripheral channel or groove 18 with marginal flanges or lips 19. The member is to be made of suitable material whereby the body will be sufficiently pliable to be compressed around the rod and the lips so elastic and flexible as to be readily forced against and held in contact with the walls of the box 11. Rubber offers a very satisfactory material for this purpose, but the invention is not to be limited to such.

The lips 19 are reduced to a very thin edge by curving their inner walls from the channel to their outer edge so as to be readily acted upon by the fluid pressure from the cylinder which enters through a port 20. The fluid fills the channel 18, thus compressing the packing member, and then tends to spread the lips, whereby they are held against the bottom wall of the box and the inner side of the nut 14. This prevents the fluid from passing between the packing member and said wall and said nut and thus finding its way to the rod 13.

Where the pressure is constant an open port from the cylinder to the box is all that is required, but where the pressure is intermittent I provide a bore 21 in the box connecting with the port 20 and having a plug 22 sealing its end and provided with a central aperture. A spring pressed ball valve 23 seats against the inner end of the plug. Upon pressure the valve opens and admits fluid to the stuffing box, but upon suction or relief of the pressure, the valve closes, thus holding the pressure in the box.

The flexible lips 19 are the essential feature of the invention and any means whereby the same results are accomplished are within the scope of the invention. These lips may extend to the intersections of the annular wall of the box and the bottom and nut thereof, as is shown, or this structure may be varied. The lips may be elongated or their shapes changed in many ways.

What I claim, is:—

A packing of the character described comprising a relatively thick cylindrical body having a peripheral channel with marginal annular lips reduced to very thin flexible edges having their inner faces curved from the bottom of the channel to their outer edges, the sides of the body being flat and extending in continuous planes radially to the edges of the lips.

In testimony whereof I affix my signature.

CHARLES S. CRICKMER.